J. P. MARQUARDT, Jr., & W. H. GETZENDANER.
Apparatus for Suspending Harness.
No. 208,477.                    Patented Oct. 1, 1878.
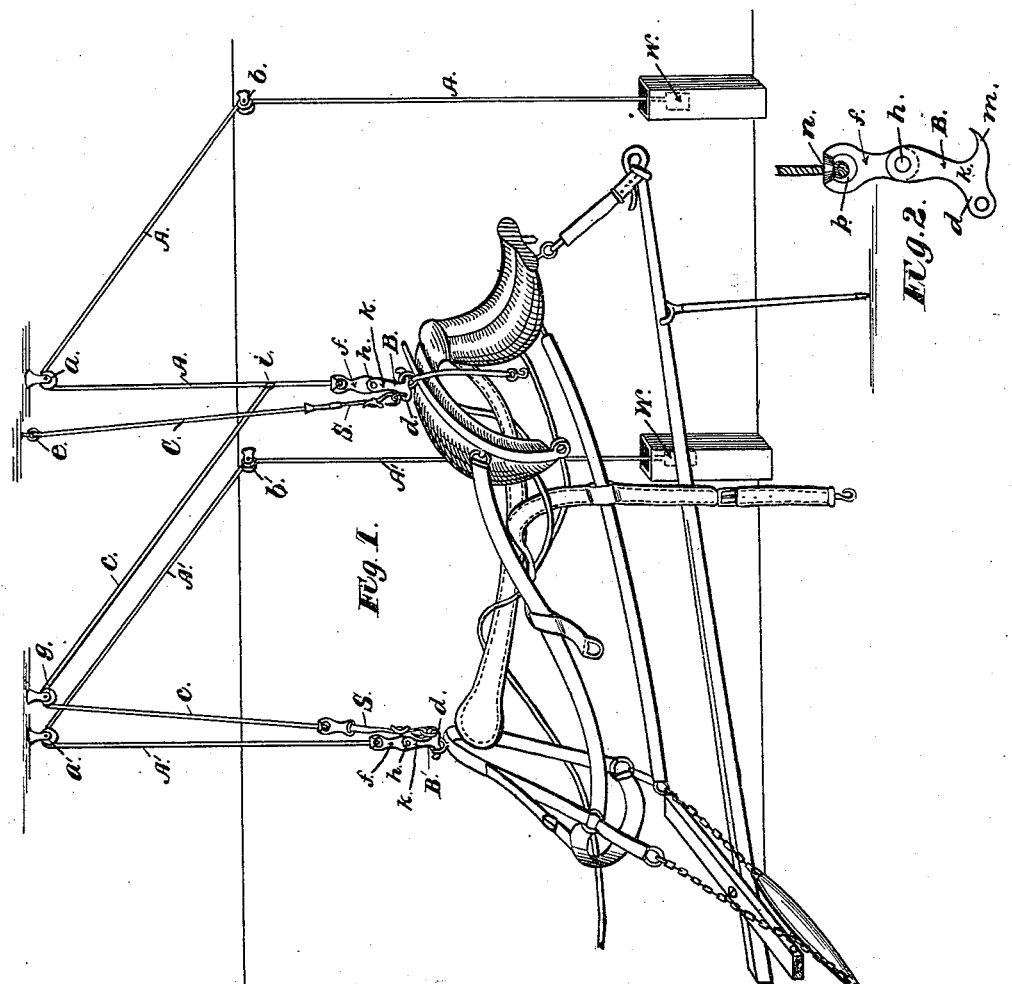

UNITED STATES PATENT OFFICE.

J. PHILIP MARQUARDT, JR., AND WILLIAM H. GETZENDANER, OF DAYTON, OHIO.

IMPROVEMENT IN APPARATUS FOR SUSPENDING HARNESS.

Specification forming part of Letters Patent No. 208,477, dated October 1, 1878; application filed September 4, 1878.

*To all whom it may concern:*

Be it known that we, J. PHILIP MARQUARDT, Jr., and WILLIAM H. GETZENDANER, of Dayton, in the county of Montgomery and State of Ohio, have invented certain new and useful Improvements in Apparatus for Suspending Harness; and we do hereby declare the following to be a full, clear, and exact description of the same.

Our invention is an improved apparatus for suspending harness ready for use in cases where there is need of great expedition in hitching up the horses, as in fire-departments.

The novelty consists in the construction and application of trip-hooks, and the arrangement of a series of ropes and pulleys for sustaining the harness when not in use, and dropping it upon the horses automatically when they are to be attached to the vehicle.

In the accompanying drawing, Figure 1 is a perspective view of our apparatus with harness suspended thereby. Fig. 2 is a side view of the trip-hook.

A A' are two ropes, which, having weights W at one end, pass over pulleys $a$ $b$ $a'$ $b'$, respectively, secured permanently to the ceiling, and are connected by a swivel-joint to the trips B B'. The weights W may be incased in upright casings. The cord C, which supports the rear end of the trip B, is secured permanently to the ceiling at $e$. Of the trip-hooks, B supports the fore part of the harness by the collar, and B' supports the rear part by the breeching.

The construction and form of the trips are shown in detail in Fig. 2, there being a hinge-joint, $h$, at the middle, a hook in front, and a rear projecting portion, $d$, at the bottom. They are attached above to the ropes by a swivel-joint formed by slipping the rope through the hole in the upper piece, $f$, and knotting its end. They are fastened below to the strap S by a ring passing through a hole in the rear portion, $d$, or by some equivalent means which will permit of easy and free movement at this point. The strap S is pierced with holes, and is connected to the trip by a buckle, so that any slack in the suspending-rope can be taken up by buckling the strap up till it is shorter.

From the front rope, A, extends the cord $c$, which, after passing over the pulley which is secured to the ceiling, is fastened to the trip B' at the point $i$, where any force that draws the cord up will tend to tilt the trip and release the suspended burden. This cord should be long enough to allow the two trips B B' to be about the same height from the floor when the harness is hung upon them. Of course, the whole harness when suspended should be far enough above the floor to permit the horse to pass easily under to his place at the tongue or between the shafts of the vehicle.

When the horse is in place, it is only necessary to grasp the collar and pull it down, and the trip B with it. This will draw the cord $c$ tight, and such cord being connected to the back of the trip B', which holds the breeching, that trip is tilted, so that the breeching slips off and down upon the horse's hips. Immediately after the breeching is released and falls, the trip B reaches a point in its descent at which it is also tilted, so as to disengage the collar and allow it to drop upon the horse's neck.

It is best to use a split collar with our suspending apparatus, to obviate the necessity of slipping it over the horse's head.

As soon as the apparatus is relieved of the weight of the harness, the weights W fall to the floor, and draw the ropes and trips up to the ceiling, or far enough up to be out of the way of the vehicle as it is drawn forward.

We are aware that it is not new to suspend the harness for fire-engines and hose-reels to the ceiling in such a way that it can be dropped upon the horse as he rushes from his stall to his place before the engine or reel; therefore we lay no broad claim to the principle involved.

What we do claim is as follows:

1. In a suspending apparatus for harness, the trips B B', composed of the hinged pieces $k$ $f$, the former of which is provided with the hook $m$ and projection $d$, and the latter having the apertures $n$ $p$ for the passage of the rope, whereby a swivel-connection is formed.

2. In combination with a set of harness and suspending-ropes, the trips B B', constructed and arranged in the manner and for the purpose specified.

3. In combination with a set of harness and trip-hooks, B B', the weighted ropes A A' and cords C c, attached to the trips by adjustable straps S, whereby the cords and trips are drawn up out of the way when the harness is released, substantially as and for the purpose specified.

Witness our hands this 21st day of August, A. D. 1878.

J. PHILIP MARQUARDT, JR.
    WM. H. GETZENDANER.

Witnesses:
    P. H. GUNCKEL,
    WM. RITCHIE.